United States Patent
Stammers et al.

(10) Patent No.: US 11,166,147 B2
(45) Date of Patent: Nov. 2, 2021

(54) ROAMING AMONG DIFFERENT TYPES OF NETWORKS

(71) Applicant: Cisco Technology, Inc., San Jose, CA (US)

(72) Inventors: Timothy P. Stammers, Raleigh, NC (US); Carlos M. Pignataro, Cary, NC (US); Marcelo Yannuzzi Sanchez, Canton de Fribourg (CH); Hervé Muyal, Gland (CH); Bart Brinckman, Nevele (BE)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 16/934,627

(22) Filed: Jul. 21, 2020

(65) Prior Publication Data
US 2021/0281994 A1 Sep. 9, 2021

Related U.S. Application Data

(60) Provisional application No. 62/985,177, filed on Mar. 4, 2020.

(51) Int. Cl.
*H04W 8/00* (2009.01)
*H04W 8/14* (2009.01)

(52) U.S. Cl.
CPC .............. *H04W 8/005* (2013.01); *H04W 8/14* (2013.01)

(58) Field of Classification Search
CPC .................................. H04W 8/005; H04W 8/14

USPC ........................................................ 455/432.1
See application file for complete search history.

(56) References Cited

U.S. PATENT DOCUMENTS

| | | | |
|---|---|---|---|
| 8,620,309 B2 | 12/2013 | Hu et al. | |
| 8,769,098 B2 | 7/2014 | Castro et al. | |
| 9,204,282 B2 | 12/2015 | Raleigh | |
| 9,391,798 B2 | 7/2016 | Khan | |
| 2013/0067082 A1* | 3/2013 | Khan | G06Q 30/00 709/225 |
| 2018/0077564 A1* | 3/2018 | Xu | H04W 8/18 |
| 2019/0259097 A1* | 8/2019 | Raleigh | H04M 15/00 |
| 2021/0037013 A1* | 2/2021 | Salkintzis | H04L 63/06 |
| 2021/0044427 A1* | 2/2021 | Wang | H04L 9/085 |

* cited by examiner

*Primary Examiner* — Hirdepal Singh
(74) *Attorney, Agent, or Firm* — Polsinelli PC (57) ABSTRACT

The present technology discloses non-transitory computer-readable media, systems, and methods for receiving a notification that an identified physical object has attached to a roaming network, wherein the identified physical object is roaming when on the roaming network; translating at least one policy intent that was defined at a home network for the identified physical object into a policy suitable to be applied by the roaming network; and sending, to the roaming network, the at least one translated policy intent to be applied to the identified physical object on the roaming network.

17 Claims, 6 Drawing Sheets

FIG. 6

ROAMING AMONG DIFFERENT TYPES OF NETWORKS

CROSS-REFERENCE TO RELATED APPLICATIONS

This application claims the benefit of priority to U.S. Provisional Patent Application No. 62/985,177, filed on Mar. 4, 2020, the content of which is incorporated herein by reference in its entirety.

TECHNICAL FIELD

The present disclosure generally relates to the field of network roaming, and more particularly to applying device specific policies to devices on roaming networks.

BACKGROUND

Network roaming has become a massive global industry and a necessity for operations in a plethora of areas. Current roaming technologies pertain to specific classes of devices and are often limited to devices roaming between networks having negotiated agreements between enterprises hosting those networks. As more and more devices gain networking capabilities in the Internet of Things and connect to an ever-increasing variety of network types, allowing devices to roam to any network becomes a service of increasing importance.

BRIEF DESCRIPTION OF THE FIGURES

To provide a more complete understanding of the present disclosure and features and advantages thereof, reference is made to the following description, taken in conjunction with the accompanying drawings, in which.

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any example term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

OVERVIEW

Disclosed herein are systems, methods and computer-readable storage media relating to the field of network roaming, and more particularly relating to the application of policies to devices on roaming networks.

A non-transitory computer readable medium can include instructions stored thereon which, when executed by a processor, cause the processor to receive a notification that an identified physical object has attached to a roaming network, wherein the identified physical object is roaming when on the roaming network. The instructions can also cause the processor to translate at least one policy intent that was defined at a home network for the identified physical object into a policy suitable to be applied by the roaming network. Further, the instructions can cause the processor to send, to the roaming network, the at least one translated policy intent to be applied to the identified physical object on the roaming network.

In some embodiments, a non-transitory computer readable medium can include instructions stored thereon which, when executed by a processor, cause the processor to receive an object definition for the identified physical object, wherein the object definition includes a device identifier, a network connectivity type, and a device class.

In some embodiments, a non-transitory computer readable medium can include instructions stored thereon which, when executed by a processor, cause the processor to receive the at least one policy intent for the identified physical object, wherein the at least one policy intent includes at least one objective paired with at least one of an access type for the identified physical object, a location of the identified physical object, and an attribute of the roaming network.

In some embodiments, a non-transitory computer readable medium can include instructions stored thereon which, when executed by a processor, cause the processor to, after the at least one translated policy intent to be applied to the identified physical device is sent to the roaming network, receive information from the roaming network regarding a first smart object that represents the identified physical object. The instructions can also cause the processor to determine that the at least one translated policy intent cannot be fulfilled based on information about the first smart object and any other smart objects that might be in communication with the first smart object. Further, the instructions can cause the processor to adapt the at least one policy intent into a second translation suitable to be applied by the roaming network.

In some embodiments, a non-transitory computer readable medium can include instructions to adapt the at least one policy intent into the second translation suitable to be applied by the roaming network stored thereon which, when executed by a processor, cause the processor to identify at least one second policy intent based on the device class and a context of the first smart object.

In some embodiments, a non-transitory computer readable medium can include instructions stored thereon which, when executed by a processor, cause the processor to, after the at least one translated policy intent to be applied to the identified physical object is sent to the roaming network, receive information from the roaming network regarding a first smart object that represents the identified physical object. The instructions can also cause the processor to determine that the at least one translated policy intent can be fulfilled. Further, the instructions can cause the processor to send a policy assurance message to an owner of the identified physical object.

In some embodiments, a non-transitory computer readable medium can include instructions stored thereon which, when executed by a processor, cause the processor to, prior to the receipt of the notification that the identified physical object has attached to the roaming network, send an object definition for the identified physical object to a gateway for the roaming network.

In some embodiments, a non-transitory computer readable medium can include instructions stored thereon which, when executed by a processor, cause the processor to, prior to the receipt of the notification that the identified physical object has attached to the roaming network, send a segmentation policy for the identified physical object to the gateway for the roaming network.

A system can include at least one processor and a non-transitory computer readable medium having stored thereon instructions which, when executed by a processor, cause the processor to receive a notification that an identified physical object has attached to a roaming network, wherein the identified physical object is roaming when on the roaming network. The instructions can also cause the at least one processor to translate at least one policy intent that was defined at a home network for the identified physical object into a policy suitable to be applied by the roaming network. Further, the instructions can cause the at least one processor to send, to the roaming network, the at least one translated policy intent to be applied to the identified physical object on the roaming network.

A method can include receiving a notification that an identified physical object has attached to a roaming network, wherein the identified physical object is roaming when on the roaming network. The method can also include translating at least one policy intent that was defined at a home network for the identified physical object into a policy suitable to be applied by the roaming network. Further, the method can include sending, to the roaming network, the at least one translated policy intent to be applied to the identified physical object on the roaming network.

The foregoing, together with other features and embodiments, will become more apparent upon referring to the following specification, claims, and accompanying drawings.

EXAMPLE EMBODIMENTS

The disclosed technology addresses the need in the art for fostering policy-governed roaming for devices across different types of networks. Further, it addresses the need for open roaming without the encumbrance of establishing peering agreements and negotiating policies between networks. The present technology involves systems, methods, and computer-readable media for applying device specific policies to devices on roaming networks.

The present disclosure details the creation of a smart object on a first domain. A smart object is a digital representation of a physical or even virtual object. Often the smart object is a representation of an IoT device or other "unmanned" device. The smart object is associated with intent-based usage policies and micro-segmentation policies, which can be defined by the first domain or by third parties. The smart object and its associated policies are then sent to a roaming provider.

The roaming provider can be accessible by a variety of additional networks to which the smart object can roam. These additional networks need only have a relationship with the roaming provider and need not have individual peering relationships in place with the owner of the smart object or the home network. Rather than agreements, the smart objects can be associated with policies of which the roaming provider can provide to roaming networks, and the roaming provider can assure compliance and enforcement of the policies associated with the smart objects. This system facilitates the open roaming of a physical or virtual object onto any network or domain that is in communication with the roaming provider.

For example, when the object enters a second domain and is detected by the second domain, the second domain can request the digital representation (smart object) and associated policies from the roaming provider. The polices can be translated from the roaming provider into a context or language that applies to the second domain. Once translated and received by the second domain, the intents of the usage policies and micro-segmentation policies associated with the smart object are matched with what the second domain is capable of fulfilling. Finally, a workflow is created which, when executed, will allow the second domain to fulfill the policy intents.

The present technology, solves several problems know in the art. First, roaming is oftentimes limited to networks which have agreements or peering relationships with each other. The present technology eliminates the need for such relationship. Second, roaming is often thought on in the context of device classes. For example, roaming system exists in the context of mobile phone roaming to carrier networks other than their primary service provider, or Wi-Fi devices can roam to certain networks for which agreements are in place. The present technology facilitate roaming of many device types and of a device across network technologies. As long as the device can be registered with the roaming provider and represented as a smart object, any device can be serviced by the present technology to roam to different domains, and/or to roam connectivity through different network technologies or frequency spectrum (e.g., NB-IoT-NB-IoT, LoRa-LoRa, CBRS-Wi-Fi 6, CBRS-Public LTE, etc.) Additionally, the present technology expands roaming to accommodate unmanned devices, such as IoT devices that might be associated with any otherwise mobile physical object, or even transfer of virtual objects from one domain to another. The present technology improves the state of the art by addressing these and other short comings of current roaming technologies.

The present technologies will be described in more detail in the following disclosure as follows. The disclosure begins with a discussion of an existing framework for open roaming on Wi-Fi networks. Once established, the disclosure will proceed to discuss an extension of the Wi-Fi open roaming framework to all types of roaming networks. Finally, the disclosure will discuss how policy intents from a home network can be interpreted and applied to a device on a roaming network.

The disclosure now turns to an initial discussion of open roaming on Wi-Fi and cellular networks. Existing Wi-Fi and cellular open roaming frameworks, such as CISCO's OpenRoaming, partner with access networks and identity providers to allow users and their devices to roam seamlessly from one network to another based on a user's identity provider credentials.

Figure 1:
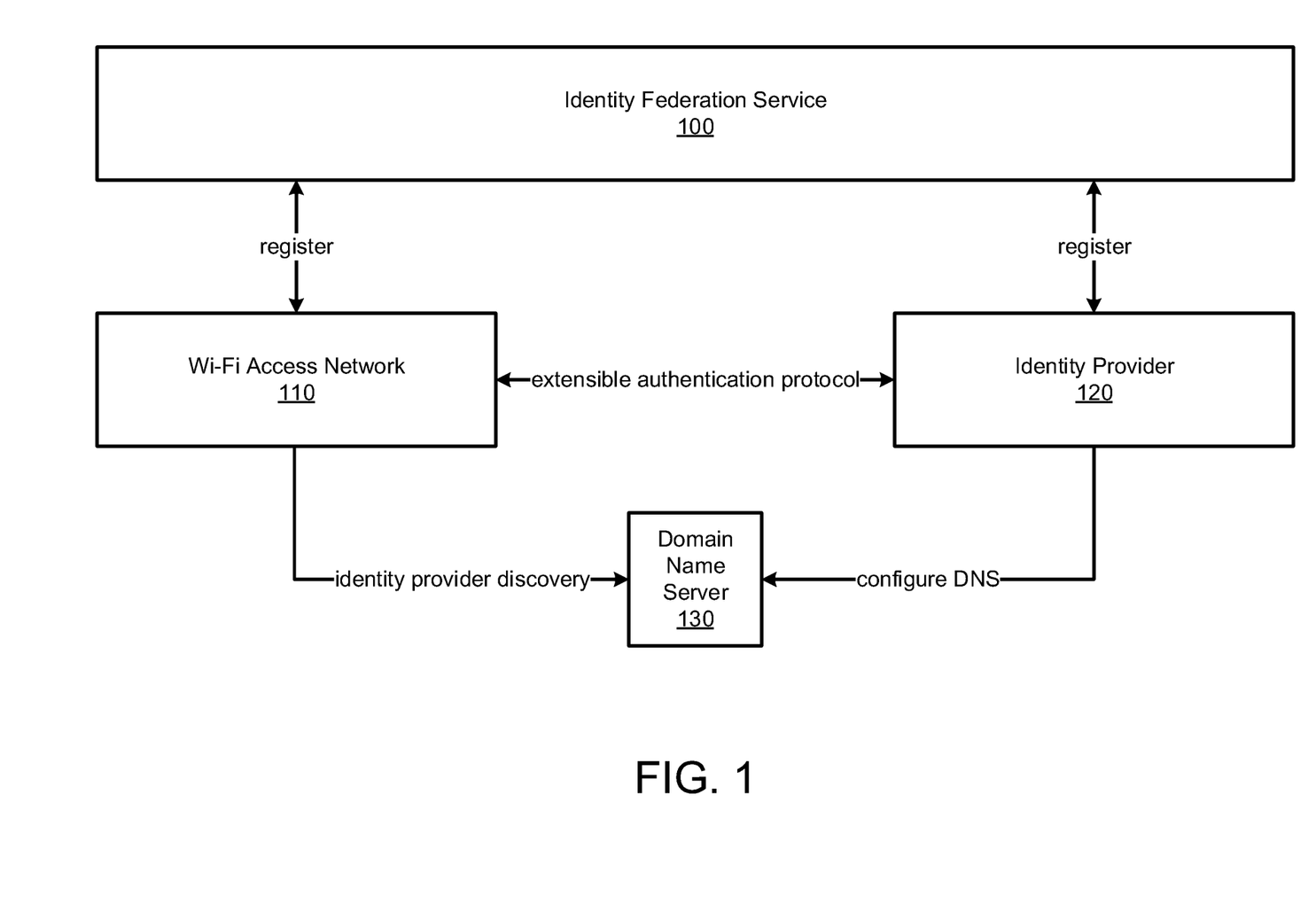
FIG. 1 illustrates an example system for implementing roaming in Wi-Fi and cellular contexts in accordance with some examples.

FIG. 1 illustrates an example system in accordance with some examples. Identity providers and Wi-Fi access networks register with an identity federation service 100 to allow devices to roam on the Wi-Fi access networks with known identities.

Identity federation service 100 houses information from Wi-Fi access networks and identity providers, coordinating the services so that users and devices with known registered identities can roam on registered access networks. When access networks and identity providers register with identity federation service 100, identity federation service 100 can issue certification to these services. Registration for access networks and identity providers can follow different protocols.

Wi-Fi access network 110 is a network which provides a networking service to a user or device. A Wi-Fi access network could be a public or private network, a local or wide-area network, or any other Wi-Fi network. To allow users roaming access, Wi-Fi access network 110 can register with identity federation service 100.

Identity provider 120 is a service which provides identity credentials to a user or device. An identity provider 120 could be a cellular service provider like VERIZON, a social network like FACEBOOK, an email service like GMAIL, or any other service which provides a user identity. To allow users to utilize these identity credentials for Wi-Fi roaming purposes, identity provider 120 can register with identity federation service 100.

After registration with identity federation service 100, identity provider 120 can configure domain name server 130 for Wi-Fi access network 110 with entry resource records for users and devices that it provides with identities. When such a device attempts to connect to Wi-Fi access network 110, Wi-Fi access network 110 can discover that identity provider 120 is an identity provider for the device on domain name server 130.

Once identity provider 120 is discovered by Wi-Fi access network 110 on domain name server 130, Wi-Fi access network 110 and identity provider 120 can create a secure tunnel to allow for authentication. In some embodiments, an extensible authentication protocol (EAP) authentication link occurs inside this tunnel. By this authentication link and the certifications issued by identity federation service 100, Wi-Fi access network 110 can confirm the identity of the device provided by identity provider 120, and grant protected access to the device.

While existing protocols for Wi-Fi and public cellular roaming exist, modern operations require roaming protocols that allow devices to roam across different types of access networks, including private cellular access networks (4G, 5G, LTE), long range (LoRa) networks, and Citizens Broadband Radio Service (CBRS) networks, among others. Furthermore, existing protocols handle policies to be applied to roaming devices in an overly broad way. Weaknesses of this scheme include policies that are group-based and that pertain to only a limited class of devices, such as phones, tablets, and computers, but not to any Internet of Things (IoT) device. For security and operational purposes, it can be useful for a home network or device owner to be able to manage device activity even when it is connected to a roaming network, and when that device is an unmanned IoT device. Additionally, scaling peering agreements and negotiating policies on a network-by-network basis quickly becomes untenable as the scope of desired roaming capabilities increases. The disclosure now turns to technologies addressing these needs in the art.

The present technology provides at least four key benefits that address the needs in the art: 1) to foster roaming capabilities on a wider range of access network types, 2) to allow home policies to be conveyed as intents and be applied on roaming networks; 3) to provide capabilities to define and enforce policies on a per device level or device-attribute level, including on IoT devices, while roaming; and 4) to foster roaming capabilities without the need for peering agreements and negotiating policies between networks by using a centralized service.

Figure 2:
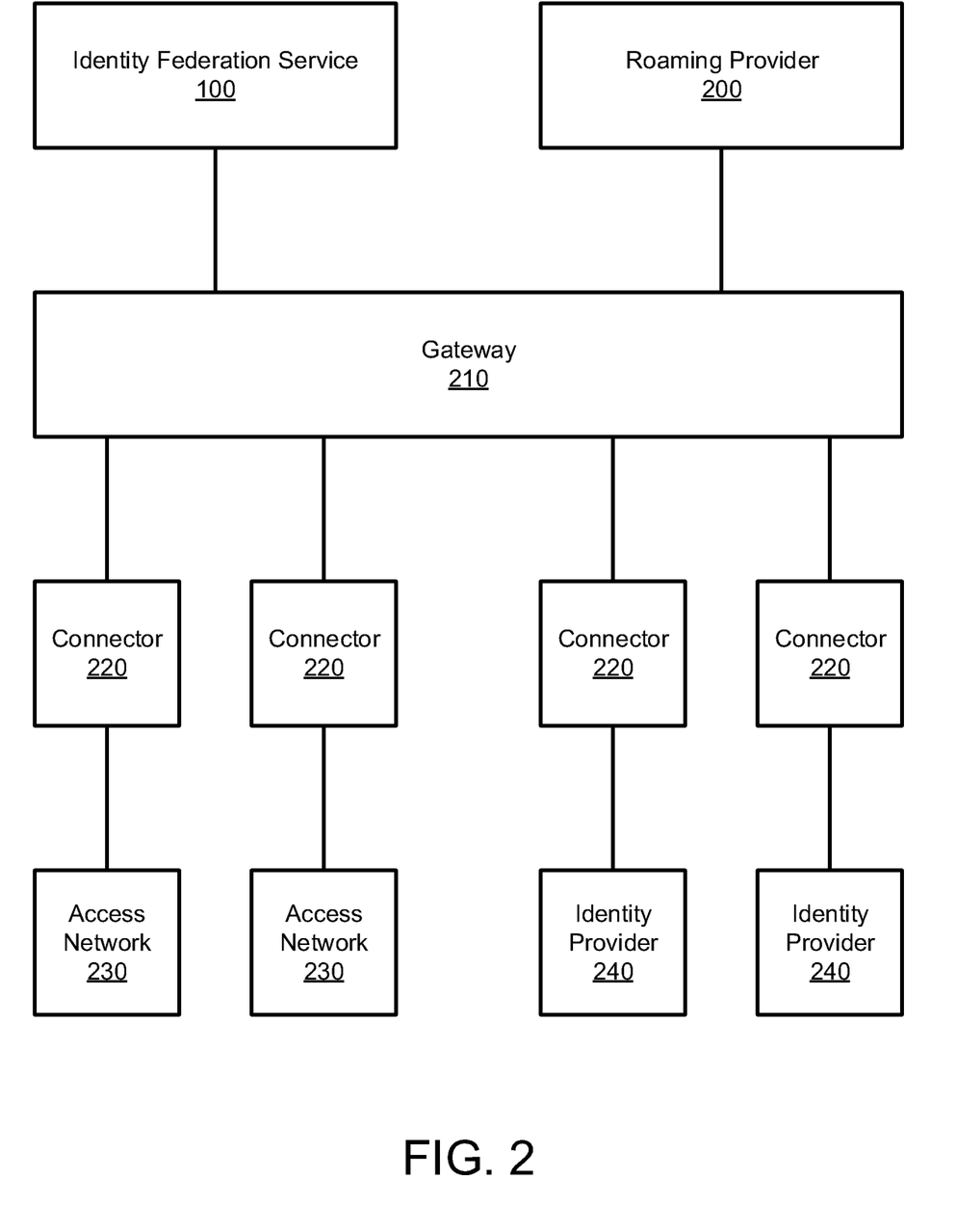
FIG. 2 illustrates an example system for implementing roaming and device-specific roaming policies across network contexts in accordance with some examples.

FIG. 2 illustrates an example system in accordance with some embodiments of the present technology. As illustrated in FIG. 2, connectors 220 and a gateway 210 foster communication between access networks 230 and identity providers 240, an identity federation service 100, and a roaming provider 200. Connectors can allow access networks of various types (Wi-Fi, cellular, LoRa, CBRS, etc.) to communicate with the roaming provider by translating policy intents and controls between the access networks and the roaming provider 200. Gateway 210 can translate communications from protocols of one networking technology type used by an access network to a networking technology type used by the roaming provider. Gateway 210 can also be responsible for providing segmentation policies.

Roaming provider 200 serves as a centralized facilitator of roaming services and policy application for all roaming devices and access networks that have registered with it. Roaming provider 200 can enable controlled access to network, policy, and device data in real-time, including location data. This last capability means that roaming provider 200 can provide insight about assets on the move, including the ability to track location; to provide relevant maps and map data; to provide telemetry data of assets and devices, including the capacity to trigger alerts when assets (such as IoT devices) go missing or need attention; and to provide device policies and behavioral metrics. Collectively, these capabilities can enable roaming provider to coordinate the application of policies from home networks/device owners onto roaming networks. Access networks 230 can be home or roaming networks or both, depending on a device, and can be any of a Wi-Fi network, a cellular network (4G, 5G, LTE), a LoRa network, a CBRS network, or other types of access networks.

Gateway 210 can interface with identity federation service 100, roaming provider 200, and connectors 220. Gateway 210 can plug into a segmentation mechanism used by any of access networks 230, such as ISE-SDAs, ISE-SGTs, ACLs, or VLANs, and can isolate network segmentation policies from policies for individual applications. Thus, gateway 210 can securely carry application policy to a roaming network control plane when a device roams on that network, and the roaming network control plane can enforce such policies as long as they do not conflict with its native segmentation policies. Gateway 210 can proxy both control and data plane traffic, and act as a gateway among heterogeneous access networks both within an enterprise and across domains. Gateway 210, along with connectors 220, can act as an intermediary between identity federation service 100 and identity providers 240. In some embodiments, identity providers 240 also represent access networks, and are considered "home networks" for certain devices or classes of devices.

For example, consider a granular policy, such as allowing a user endpoint on a CBRS network to connect to a device on a LoRa network when that LoRa device is in a specific location, where the LoRa device is the roaming device. Traffic between the user endpoint and the LoRa device can be proxied by gateway 210 and forwarded to the corresponding LoRa network server in an access network 230, provided that the location restraints are met.

Gateway 210 can further facilitate trusted and automated discovery of devices and assets across heterogeneous access networks 230. Instead of relying on external asset tracking applications, gateway 210 provides a trusted anchor to ensure that a roaming device has effectively appeared on one of access networks 230 in the scope of roaming provider 200. Gateway 210 can further resolve discrepancies in asset discovery; for instance, consider an example where one device has multiple sensors for different types of access networks 230. With access to location data, gateway 210 can resolve asset discovery to a single device, when otherwise these sensors could be discovered as separate entities. Such resolution could be solved by data gathered directly by gateway 210 and data received from outside sources, such as identity federation service 100, roaming provider 200, or others. When assets are resolved, gateway 210 can pass this information to identity federation service 100, roaming provider 200, access networks 230, or other relevant data centers.

Connectors 220 serve as intermediaries and translators between access networks 230 and gateway 210 and roaming provider 200. By exploiting the existing interfaces and APIs of access networks 230, they can interface with control planes and data planes, facilitating the application of policies, including micro-segmentation policies, from roaming provider 200 via gateway 210. For instance, when interfacing with control plane elements of private LTE or CBRS network, a connector 230 could interface with mobility management entities (MMEs) on those networks. Connectors 220 can facilitate functions such as enabling discovery of endpoint devices and accessing relevant data such as IDs, locations, and roaming profiles of endpoint devices.

Collectively, the system illustrated in FIG. 2 can implement the application policies applicable to a roaming device on an access network 230 to which the roaming device has attached. In some cases, the policies applicable to the roaming device are defined by the owner of the roaming device. In some cases, the policies applicable to the roaming device are defined by a home access network 230.

Figure 3:
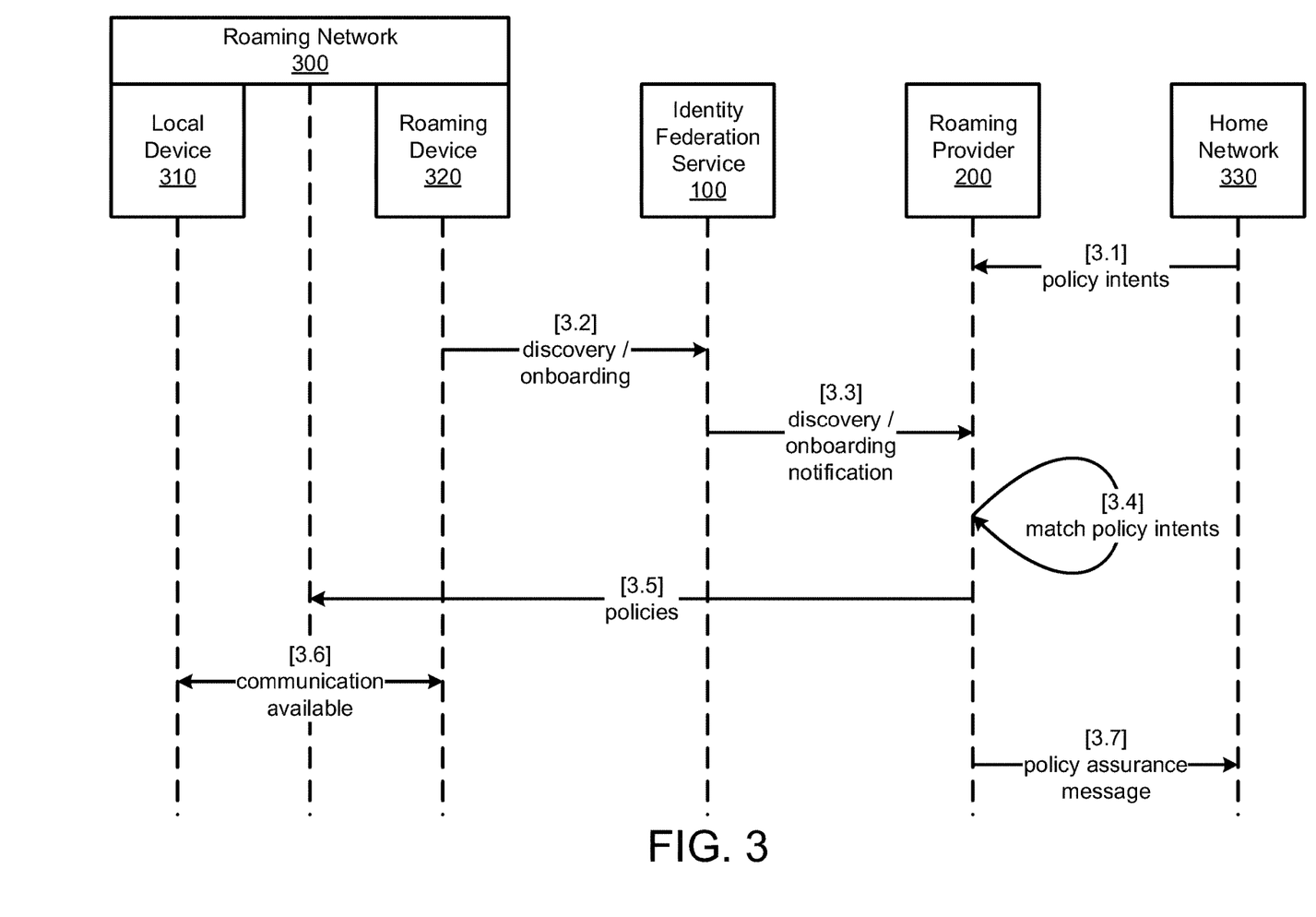
FIG. 3 illustrates an example sequence diagram detailing the sequence for implementing device-specific roaming policies across network contexts in accordance with some examples.

FIG. 3 illustrates an example sequence diagram in accordance with some aspects of the present technology. FIG. 3 will be discussed in the context of an example IOT container smart lock 320 traveling on a ship that docks at a port. The smart lock can be associated with policies defined by the smart lock owner or by the operator 330 of the originating port. Upon arriving at the destination port, and potentially along the journey to the destination port, the smart lock 320 can attach to a roaming network 320. The roaming network 300 can identify the smart lock 320 through communications with the roaming provider 200, which can, in turn, ensure that the roaming network 300 is aware of and complies with the policies associated with the smart lock 320. Roaming network 300 and home network 330 are both examples of access networks 230, as described in FIG. 2.

At process [3.1], roaming provider 200 receives a set of policy intents from home network 330. These policy intents can specify usage policies, assurance policies, micro-segmentation policies, or other kinds of policies for roaming device 320, (e.g., the container smart lock). Roaming provider 200 can use its translation capabilities to adapt these policy intents for specific situations as they arise.

In some embodiments, a policy comprises an objective defined by home network 330 or device owner paired with contextual information. Contextual information can be the access type (Wi-Fi, cellular, LoRa, etc.) of roaming device 320, the location of roaming device 320, or an attribute of roaming network 300, such as its access type, other devices available on the network, an attribute of the roaming device 320, objective of the roaming device 320, or other contextual information. Thus, a policy can be specific to a device, devices with certain attributes, devices in certain locations, or devices meeting other contextual criteria. Policies can also be modified by the device owner over time, and even while roaming device 320 is attached to a roaming network 300. In some embodiments, policies may comprise micro-segmentation of roaming network 300, wherein endpoints such as local device 310 (the terminal operator) and roaming device 320 (the smart lock) are assigned to endpoint groups. These endpoint groups can have specific policies applied to them that are not applied to all endpoints in roaming network 300, allowing for granular application of policies from home network 330 or other access networks 230.

In the example of the smart lock roaming device 320, policies could define roaming networks 300 in which it is expected that the roaming device 320 might attach, and identify a device or user on the roaming network 300 that is authorized to communicate with the smart lock to open the lock. Other policies such as segmentation policies can also be provided.

In some embodiments, such as in an instance wherein a roaming device 320 is expected to roam onto a specific roaming network 300, policies and device identification information can be sent to gateway 210 or roaming network 300 in advance of step [3.2].

At process [3.2], roaming network 300 discovers roaming device 320 as roaming device 320 attempts to attach to roaming network 300 and onboards the device with identity federation service 100. Once an identity has been established for roaming device 320, at process [3.3] roaming provider 200 receives a discovery and onboarding notification from identity federation service 100. The notification can include an object definition. In some embodiments, an object definition can include a device identifier, a device class, and a device access type. In order to successfully apply policies to roaming network 300 or roaming device 320 from home network 330 or the device owner, roaming provider 200 needs a clear definition of what roaming device 320 comprises. Policy intents may apply to a specific device, a device class, a device access type, or other devices with specific attributes. With this information for roaming device 320, roaming provider 200 can apply appropriate granular policies.

In some embodiments, prior to the discovery and onboarding of roaming device 320, roaming provider 200 can receive an object definition from home network 330 defining roaming device 320. The definition can include a device ID, object class, and a network connectivity type. In some embodiments, roaming device 320 can send this definition to gateway 310 prior to the discovery and onboarding of roaming device 320.

Once a device has been discovered, onboarded, and roaming provider 200 has been notified, at process [3.4], roaming provider 200 can match policy intents of the policies associated with the roaming device 320 with policies that match the context of the roaming network 300. This process involves taking policy intents received from home network 330; extracting the policy intents which apply to the present situation based on information about roaming device 320 and roaming network 300 (access network type, device class, device ID, location, device access type, or other factors); and translating these policy intents into policies that roaming network 300 can implement.

In order to translate a policy intent into policies for roaming network 300, roaming provider 200 can create a smart object corresponding to roaming device 320. A smart object is a virtual representation of a physical object, such as roaming device 320. By virtually representing a physical object as a smart object, roaming provider 200 or roaming network 300 can simulate the possible effects of different policies and different policy translations on roaming device 320, roaming network 300, and other devices on roaming network 300, such as local device 310. This simulation ultimately allows roaming provider 200 or roaming network 300 to understand to what extent a policy can be carried out before it is implemented. These simulations can also be run in tandem between roaming provider 200 and roaming network 300. In some embodiments, such simulations will run as off-line processes, and can run after roaming provider 200 receives a policy intent from home network 330 but before the policy intent is invoked or applied for the first time. Simulations can be applied to the introduction of a single device or to a set of devices with a common attribute, such as device type, home network, etc.

Once policies are created through translation, roaming provider 200 can send the resultant policies to roaming network 300 at process [3.5]. In some embodiments, these policies can pass through a gateway 210 or connector 220 between roaming provider 200 and roaming network 300. In some embodiments, micro-segmentation policies may be enforced by a policy enforcement engine for roaming network 300, such as CISCO's Identity Services Engine.

In the example of the smart lock, the policies comprise allowing the smart lock (roaming device 320) to communicate with the terminal operator (local device 310). At process [3.6], roaming network 300 applies the received policies to allow communication between roaming device 320 and local device 310. Once roaming provider 200 determines that policies have been successfully implemented, it can send a policy assurance message at process [3.7] to home network 330, assuring home network 330 that its policy intents have been successfully implemented on a roaming network.

Figure 4:
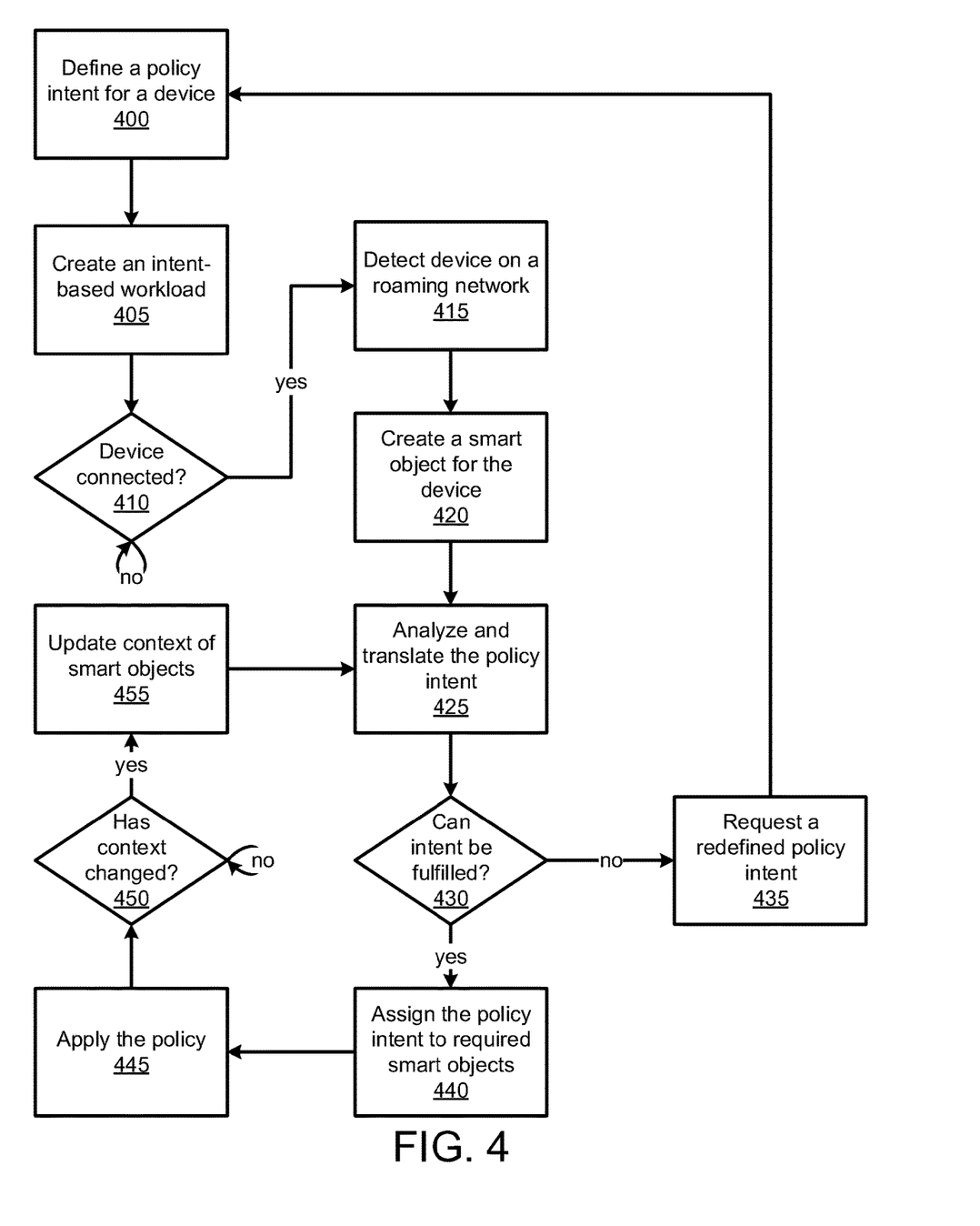
FIG. 4 illustrates an example method for updating device-specific roaming policies in accordance with some examples.

In some cases, a policy translated from a policy intent will need further refinement. For example, roaming network 300 may not be able to apply the translated policy. FIG. 4 illustrates an example method for handling the creation of a second translation of a given policy intent in order to implement the policy intent on a roaming network.

The method begins when a policy intent for a roaming device 320 is defined (400). This definition can occur when home network 330 sends a policy intent to roaming provider 200. Once the policy intent is received, roaming provider 200 creates (405) an intent-based workload to prepare for the creation and application of policy on an access network like roaming network 300. The method pauses here until roaming device 320 connects (410) to roaming network 300.

Once roaming device 320 is connected to roaming network 300, identity federation service 100 and roaming provider 200 detect (415) roaming device 320 on roaming network 300. Upon detection, roaming provider 200 creates (420) a smart object corresponding to roaming device 320. Once the smart object is created, roaming network 300 or roaming provider 200, either together or separately, analyze and translate (425) the policy intent into a policy. In some embodiments, this step of analysis and translation can occur before roaming device 320 connects to roaming network 300, and analysis and translation into policy can be done based on attributes of roaming device 320, such as device class, brand, its identity provider, or other factors.

If the intent cannot (430) be fulfilled, roaming provider 200 can request (435) a redefinition of the policy intent. For instance, if a new device appears on roaming network 300, the roaming provider can create a smart object of this device and determine if it has any implications for the policies currently applied to roaming device 320. Ultimately, this can result in a second translation of the policy intent to be applied to roaming network 300. In some cases, the second translation of the policy intent will be a result of identifying a second policy intent, and creating the second translation taking into account both the original and second policy intents. For instance, if the aforementioned new device on roaming network 300 is known to be compromised and a secondary policy intent defined by home network 330 restricts communication by roaming device 320 on a network with known compromised devices, roaming provider 200 can resolve these separate policy intents into a second translation.

If the intent can (430) be fulfilled, roaming provider 200 assigns (440) the policy intent to the required smart objects corresponding to physical objects in roaming network 300, such as local device 310 and roaming device 320. Roaming provider 200 forwards the policy to roaming network 300, which applies (445) the policy. The method pauses here until the context of roaming device 320 changes (450). If the context changes, roaming provider 200 updates (455) the context of smart objects corresponding to physical objects in roaming network 300.

This method allows for continual, dynamic adjustment of policies based on refinements of policy intents and the practical limitations of potentially conflicting policies. For instance, using the example discussed previously, the policy intent from home network 330 may aim to foster communication between the smart lock (roaming device 320) and the terminal operator (local device 310) as soon as the smart lock enters roaming network 300. However, roaming network 300 may have a native policy that allows such communication only during standard working hours such that a network administrator can manually handle certain kinds of errors. If the ship pulls into port during the night, these policies come into conflict, and must be resolved by roaming provider 200, perhaps by allowing communication between local device 310 and roaming device 320 at the earliest possible time.

Figure 5:
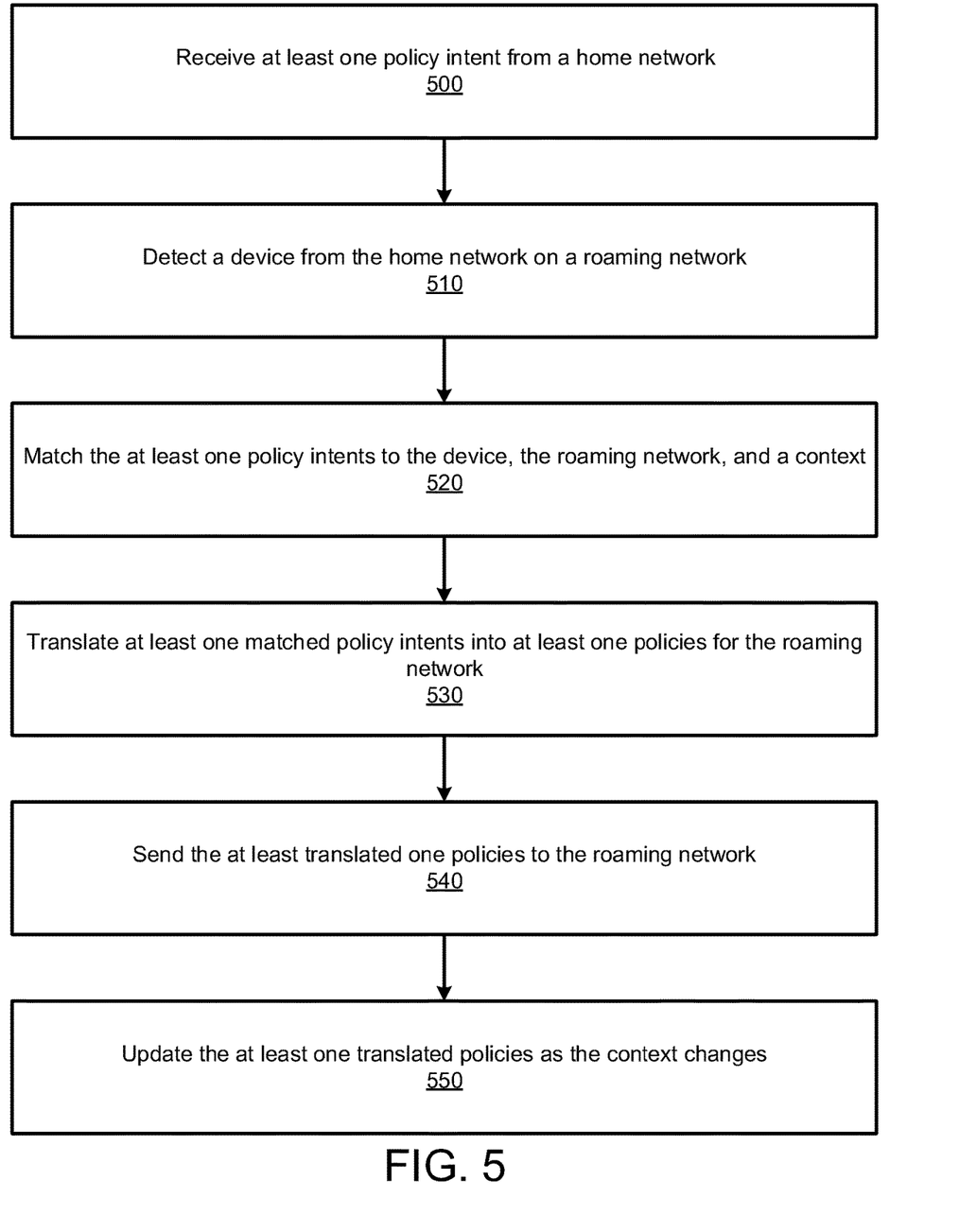
FIG. 5 illustrates an example method for implementing roaming and device-specific roaming policies across network contexts in accordance with some examples.

FIG. 5 illustrates an example method in accordance with some examples. A roaming provider receives policy intents from a home network, which are applied to a roaming network when a device from the home network roams on the roaming network.

The method begins when roaming provider 200 receives (500) at least one policy intent from home network 330. In some embodiments, the policy intent includes at least one objective paired with at least one of an access type for roaming device 320, a location of roaming device 320, and an attribute of roaming network 300 (access type, range, etc.). When roaming device 320 roams onto roaming network 300, roaming provider 200 detects (510) roaming device 320 via identity federation service 100, which onboards roaming device 320.

Once roaming device 320 is detected, roaming provider 200 matches (520) the at least one policy intents to roaming device 320, roaming network 300, and a context. Context can include location, time of day, or other factors influencing the application of policy. Matched policy intents can be determined using the creation of smart objects corresponding to physical devices in roaming network 300, which allows roaming provider 200 or roaming network 300 to simulate the effect of policies on roaming network 300. Matched policy intents are translated (530) into policies for roaming network 300 by roaming provider 200.

Roaming provider 200 sends (540) the at least one translated policies to roaming network 300. In some cases, the at least one translated policies will not function as expected, or the context of roaming device 320 or roaming network 300 will change. In these cases, roaming provider 200 updates (550) the at least one translated policies into second translations for roaming network 300.

In some embodiments, policy intents defined by a home network or device owner can be usage and assurance policies. The usage and assurance policies allow roaming provider 200 to apply differentiated policies for a specific IoT object, dependent on its access type. Roaming provider 200 can adapt usage-based automation rules based on a combination of IoT object type plus its use case, access type, location, identity provider service policies, and identity owner policies.

An IoT object type plus its use case describes the type and usable limits of usage and assurance capabilities. Roaming provider 200 identifies the IoT object as it moves across access types, and can identify usable limits of the roaming device. Roaming provider 200 adapts the policies to ensure that the expected behavior of the device across access types is maintained within acceptable bounds, while also maintaining a level of usage and assurance reporting acceptable for the device use case.

As an IoT object moves from network to network, or from access type to access type, roaming provider 200 can track the IoT object. The granularity available in the application of usage and assurance policies is possible only because the individual IoT object is tracked across networks. Policies are then tied to this object, plus its use case.

In some embodiments, access networks will be cellular networks, allowing for enterprise cellular roaming. Identity federation service 100 acts on behalf of multiple identity providers 120, such as cellular providers VERIZON, AT&T, OR SPRINT. The approach can also allow roaming on a non-cellular access network that has adopted a Diameter-based approach, where Diameter is a protocol evolving from the RADIUS (remote authentication dial-in user service) protocol. RADIUS is used to authenticate, authorize, and account for users who connect to and use a network service, such as any of access networks 230.

The non-cellular access network roaming system comprises two components. One is an access-network-specific function that serves as a Diameter network server. This functional server emulates the home network of a roaming device for the purposes of cellular network authentication, location, and subscription updates and session termination. It can be deployed on-premises or as a cloud service. Identity federation service 100 can function as a Diameter client on behalf of the non-cellular access network, and determine the correct identification owner, such as VERIZON, AT&T, OR SPRINT. Identity federation service 100 can authenticate on behalf of the identifications owner (as a form of fast re-authentication) or rely on the identification owner for authentication services.

The emulation of the home network prevents the need for pre-arrangements between home networks and roaming access networks. Identity federation service 100 serves as a middleman to prevent the otherwise massive logistical challenges, and facilitate roaming.

In some embodiments, access networks 230 will be LoRa networks. Roaming in LoRa networks requires connections to hNS, sNS and fNS servers across LoRa domains. In current protocols, this entails a tedious manual process for generating keys, certificates, and configuration files to connect these servers on a peer-to-peer basis. This means that the number of needed manual configurations grows quadratically with the number of LoRa networks that need connecting. In addition, current protocols do not offer a way to enable roaming across LoRa networks dynamically— LoRa roaming occurs when configurations between networks are established in advance as opposed to being implemented on-the-fly.

The present disclosure provides new means to scale LoRa network roaming, while not only automating the entire roaming process but also allowing networks to accept roaming requests dynamically. Conversely to elements of the prior art, such as roaming hubs, where roaming partners need to adhere to a hub's rules for packet routing, service levels, and trust, this disclosure keeps routing and data exchanges under the control of each LoRa network server.

FIGS. 2-5 described systems, methods, and non-transitory computer-readable media addressing needs in the art. The present disclosure provides advances which allow for 1) fostering roaming capabilities on a wider range of access network types, 2) allowing home policies to be conveyed as intents and be applied on roaming networks; 3) providing capabilities to define and enforce policies on a per device level or device-attribute level, including on IoT devices, while roaming; and 4) fostering roaming capabilities without the need for peering agreements and negotiating policies between networks by using a centralized service. The disclosure will now turn to a discussion of an example system architecture.

Figure 6:
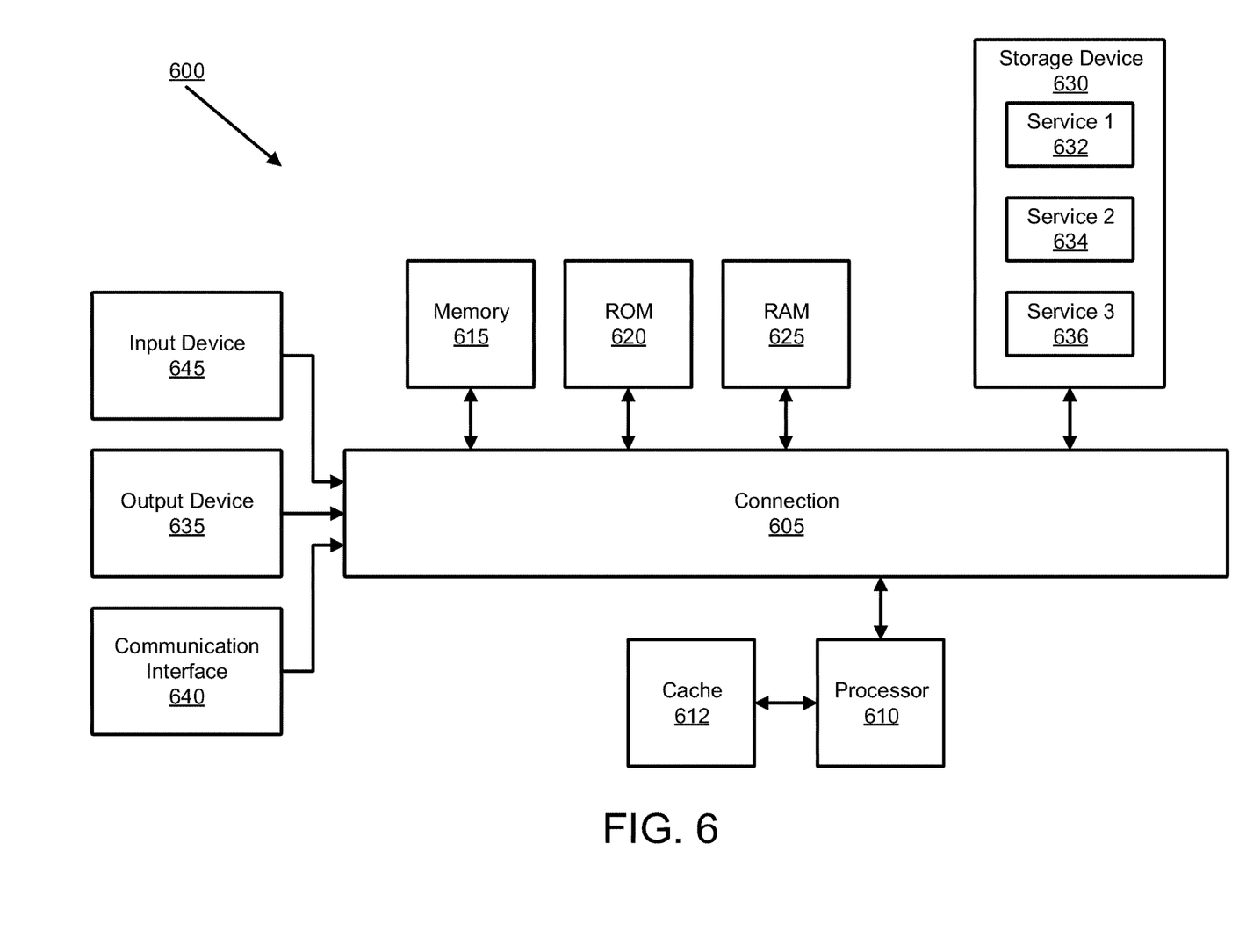
FIG. 6 illustrates an example computing device in accordance with some examples.

FIG. 6 illustrates an example system architecture in accordance with some examples. The example system architecture may comprise all or a component of devices or services in the present disclosure, such as roaming provider 200.

FIG. 6 illustrates an example of a bus computing system 600 wherein the components of the system are in electrical communication with each other using a bus 605. The computing system 600 can include a processing unit (CPU or processor) 610 and a system bus 605 that may couple various system components including the system memory 615, such as read only memory (ROM) 620 and random access memory (RAM) 625, to the processor 610. The computing system 600 can include a cache 612 of high-speed memory connected directly with, in close proximity to, or integrated as part of the processor 610. The computing system 600 can copy data from the memory 615, ROM 620, RAM 625, and/or storage device 630 to the cache 612 for quick access by the processor 610. In this way, the cache 612 can provide a performance boost that avoids processor delays while waiting for data. These and other modules can control the processor 610 to perform various actions. Other system memory 615 may be available for use as well. The memory 615 can include multiple different types of memory with different performance characteristics. The processor 610 can include any general purpose processor and a hardware module or software module, such as SERVICE (SVC) 1 632, SERVICE (SVC) 2 634, and SERVICE (SVC) 3 636 stored in the storage device 630, configured to control the processor 610 as well as a special-purpose processor where software instructions are incorporated into the actual processor design. The processor 610 may essentially be a completely self-contained computing system, containing multiple cores or processors, a bus, memory controller, cache, etc. A multi-core processor may be symmetric or asymmetric.

To enable user interaction with the computing system 600, an input device 645 can represent any number of input mechanisms, such as a microphone for speech, a touch-protected screen for gesture or graphical input, keyboard, mouse, motion input, speech and so forth. An output device 635 can also be one or more of a number of output mechanisms known to those of skill in the art. In some instances, multimodal systems can enable a user to provide multiple types of input to communicate with the computing system 600. The communications interface 640 can govern and manage the user input and system output. There may be no restriction on operating on any particular hardware arrangement and therefore the basic features here may easily be substituted for improved hardware or firmware arrangements as they are developed.

The storage device 630 can be a non-volatile memory and can be a hard disk or other types of computer readable media which can store data that are accessible by a computer, such as magnetic cassettes, flash memory cards, solid state memory devices, digital versatile disks, cartridges, random access memory, read only memory, and hybrids thereof.

As discussed above, the storage device 630 can include the software services 632, 634, 636 for controlling the processor 610. Other hardware or software modules are contemplated. The storage device 630 can be connected to the system bus 605. In some embodiments, a hardware module that performs a particular function can include a software component stored in a computer-readable medium in connection with the necessary hardware components, such as the processor 610, bus 605, output device 635, and so forth, to carry out the function.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer readable media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language reciting "at least one of" a set indicates that one member of the set or multiple members of the set satisfy the claim. For example, claim language reciting "at least one of A and B" means A, B, or A and B.

The invention claimed is:

1. A non-transitory computer readable medium comprising instructions stored thereon, the instructions being effective to cause at least one processor to:
   receive a notification that an identified physical object has attached to a roaming network, wherein the identified physical object is roaming when on the roaming network;
   translate at least one policy intent that was defined at a home network for the identified physical object into a policy suitable to be applied by the roaming network;
   send, to the roaming network, the at least one translated policy intent to be applied to the identified physical object on the roaming network; and
   receive the at least one policy intent for the identified physical object, wherein the at least one policy intent includes at least one objective paired with at least one of an access type for the identified physical object, a location of the identified physical object, and an attribute of the roaming network.

2. The non-transitory computer readable medium of claim 1, comprising further instructions effective to cause the at least one processor to:
   receive an object definition for the identified physical object, wherein the object definition includes a device identifier, a network connectivity type, and a device class.

3. The non-transitory computer readable medium of claim 1, comprising further instructions effective to cause the at least one processor to:
   after the at least one translated policy intent to be applied to the identified physical device is sent to the roaming network, receive information from the roaming network regarding a first smart object that represents the identified physical object;
   determine that the at least one translated policy intent cannot be fulfilled based on information about the first smart object and any other smart objects that might be in communication with the first smart object; and
   adapt the at least one policy intent into a second translation suitable to be applied by the roaming network.

4. The non-transitory computer readable medium of claim 3, wherein the instructions to adapt the at least one policy intent into the second translation suitable to be applied by the roaming network include instructions to:
   identify at least one second policy intent based on the device class and a context of the first smart object.

5. The non-transitory computer readable medium of claim 1, comprising further instructions effective to cause the at least one processor to:
   after the at least one translated policy intent to be applied to the identified physical object is sent to the roaming network, receive information from the roaming network regarding a first smart object that represents the identified physical object;
   determine that the at least one translated policy intent can be fulfilled; and
   send a policy assurance message to an owner of the identified physical object.

6. The non-transitory computer readable medium of claim 1, comprising further instructions effective to cause the at least one processor to:
   prior to the receipt of the notification that the identified physical object has attached to the roaming network, send an object definition for the identified physical object to a gateway for the roaming network.

7. The non-transitory computer readable medium of claim 6, comprising further instructions effective to cause the at least one processor to:
   prior to the receipt of the notification that the identified physical object has attached to the roaming network, send a segmentation policy for the identified physical object to the gateway for the roaming network.

8. A system comprising:
   at least one processor; and
   a non-transitory computer readable medium comprising instructions stored thereon, the instructions being effective to cause the at least one processor to:
      receive a notification that an identified physical object has attached to a roaming network, wherein the identified physical object is roaming when on the roaming network;
      translate at least one policy intent that was defined at a home network for the identified physical object into a policy suitable to be applied by the roaming network;
      send, to the roaming network, the at least one translated policy intent to be applied to the identified physical object on the roaming network; and
      receive the at least one policy intent for the identified physical object, wherein the at least one policy intent includes at least one objective paired with at least one of an access type for the identified physical object, a location of the identified physical object, and an attribute of the roaming network.

9. The system of claim 8, the system comprising further instructions effective to cause the at least one processor to:
   receive an object definition for the identified physical object, wherein the object definition includes a device identifier, a network connectivity type, and a device class.

10. The system of claim 8, the system comprising further instructions effective to cause the at least one processor to:
   after the at least one translated policy intent to be applied to the identified physical device is sent to the roaming network, receive information from the roaming network regarding a first smart object that represents the identified physical object;
   determine that the at least one translated policy intent cannot be fulfilled based on information about the first smart object and any other smart objects that might be in communication with the first smart object; and
   adapt the at least one policy intent into a second translation suitable to be applied by the roaming network.

11. The system of claim 10, wherein the instructions to adapt the at least one policy intent into the second translation suitable to be applied by the roaming network include instructions to:

identify at least one second policy intent based on the device class and a context of the first smart object.

12. The system of claim 8, the system comprising further instructions effective to cause the at least one processor to:
after the at least one translated policy intent to be applied to the identified physical object is sent to the roaming network, receive information from the roaming network regarding a first smart object that represents the identified physical object;
determine that the at least one translated policy intent can be fulfilled; and
send a policy assurance message to an owner of the identified physical object.

13. The system of claim 8, the system comprising further instructions effective to cause the at least one processor to:
prior to the receipt of the notification that the identified physical object has attached to the roaming network, send an object definition for the identified physical object to a gateway for the roaming network.

14. The system of claim 13, the system comprising further instructions effective to cause the at least one processor to:
prior to the receipt of the notification that the identified physical object has attached to the roaming network, send a segmentation policy for the identified physical object to the gateway for the roaming network.

15. A method comprising:
receiving a notification that an identified physical object has attached to a roaming network, wherein the identified physical object is roaming when on the roaming network;
translating at least one policy intent that was defined at a home network for the identified physical object into a policy suitable to be applied by the roaming network;
sending, to the roaming network, the at least one translated policy intent to be applied to the identified physical object on the roaming network; and
receiving the at least one policy intent for the identified physical object, wherein the at least one policy intent includes at least one objective paired with at least one of an access type for the identified physical object, a location of the identified physical object, and an attribute of the roaming network.

16. The method of claim 15, further comprising:
after the at least one translated policy intent to be applied to the identified physical object is sent to the roaming network, receiving information from the roaming network regarding a first smart object that represents the identified physical object;
determining that the at least one translated policy intent cannot be fulfilled based on information about the first smart object and any other smart objects that might be in communication with the first smart object; and
adapting the at least one policy intent into a second translation suitable to be applied by the roaming network.

17. The method of claim 16, wherein the adapting the at least one policy intent into the second translation suitable to be applied by the roaming network comprises:
identifying at least one second policy intent based on a device class and a context of the first smart object.

\* \* \* \* \*